No. 774,977. PATENTED NOV. 15, 1904.
A. A. BROOKS.
MAGAZINE PLATE CHANGING APPARATUS FOR PHOTOGRAPHIC CAMERAS.
APPLICATION FILED FEB. 7, 1903.
NO MODEL. 2 SHEETS—SHEET 2.
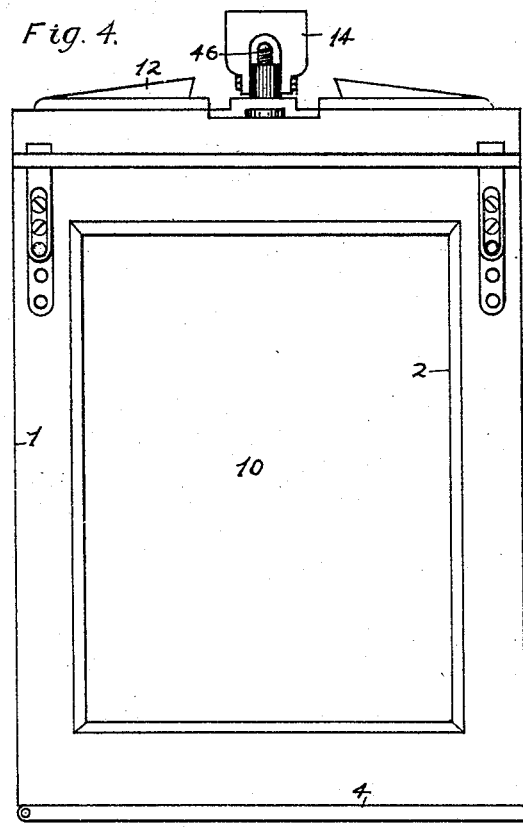
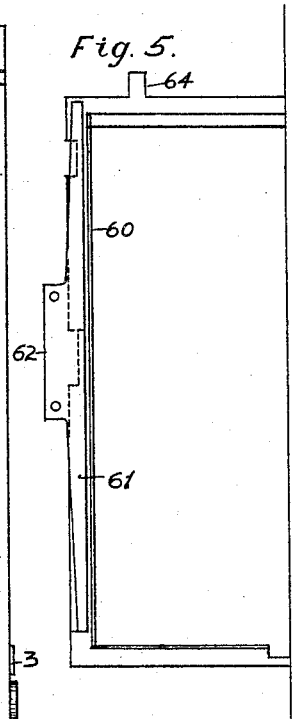
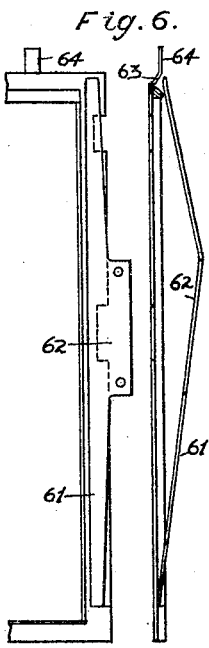
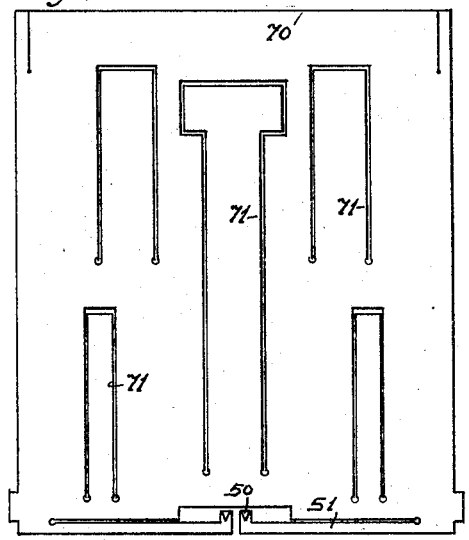
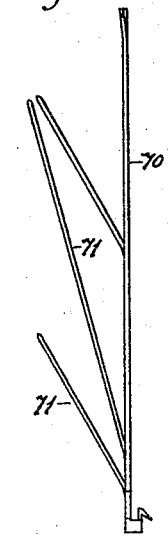
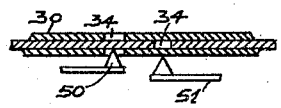
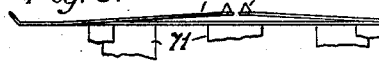
Inventor
A. A. Brooks
Witnesses By his attorney No. 774,977. Patented November 15, 1904.

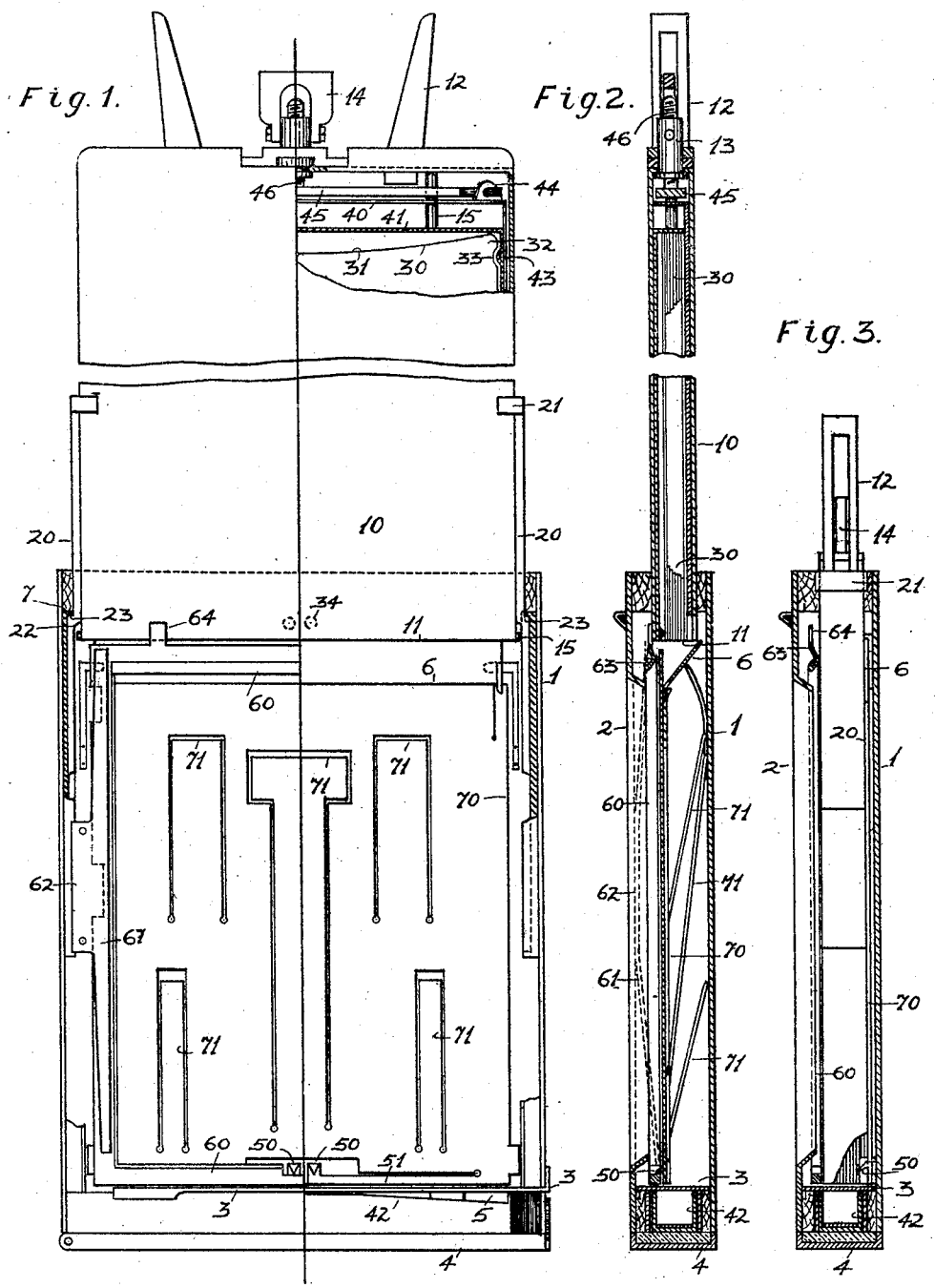

UNITED STATES PATENT OFFICE.

ARTHUR AUGUSTUS BROOKS, OF LIVERPOOL, ENGLAND.

MAGAZINE PLATE-CHANGING APPARATUS FOR PHOTOGRAPHIC CAMERAS.

SPECIFICATION forming part of Letters Patent No. 774,977, dated November 15, 1904.

Application filed February 7, 1903. Serial No. 142,274. (No model.)

*To all whom it may concern:*

Be it known that I, ARTHUR AUGUSTUS BROOKS, a subject of the King of Great Britain and Ireland, and a resident of Liverpool, in the county of Lancaster, England, have invented new and useful Improvements in Magazine Plate-Changing Apparatus for Photographic Cameras, of which the following is a specification.

This invention relates to improved magazine plate-changing apparatus for photographic cameras for holding a number of sensitized plates and exposing them in succession and which is operated by drawing out and pushing in a slide.

The system to which these improvements particularly relate is characterized by the employment of an exposure frame or casing having a hollow or box slide forming the magazine and holding the plates therein by their side edges, from which the plates are withdrawn one at a time upon the withdrawal of the slide or magazine, which leaves the withdrawn plate in the exposure-frame, the plate being seized by a spring-claw engaging a hole in its bottom margin when the magazine is pushed in. The method of holding the plates and of charging the magazine which I prefer to employ is particularly described in the specification of application for Letters Patent of the United States, Serial No. 138,328, filed January 9, 1903.

In an apparatus made in accordance with this invention when there are unexposed plates in the magazine a plate is left in the exposure-frame upon every withdrawal stroke of the magazine. The plate is exposed when the magazine is fully withdrawn. Upon pushing in the magazine the plate is included therein again, but at the opposite side to that from which it was withdrawn. A plate or sheet forming a dummy or blank may be included with the others, so that the exposed plates are pushed in upon one side of it, while those not yet withdrawn lie upon the other side of it.

My improvements have for their object to enable thin-cut films or flexible plates to be used with efficiency in a simple and compact apparatus.

In the drawings attached hereunto, Figure 1 represents the apparatus in part sectional elevation with the front removed and the magazine withdrawn. Fig. 2 represents a sectional side elevation, also with the magazine withdrawn. Fig. 3 represents a sectional side elevation showing the magazine pushed in, and Fig. 4 a front elevation showing the magazine pushed in. Figs. 5 to 9 represent two different views of each of two principal parts according to this invention. Fig. 10 shows the relative positions of the holes in alternate plates.

In the apparatus illustrated the backmost plate is seized and detained for exposure and after exposure upon pushing in the magazine is included therein upon the top or front of the pack of plates.

Referring now to the drawings, 1 represents the exposure-frame which has an exposure-aperture 2, a metal slide 3, a light-tight door 4 at the bottom, a cavity 5 between the slide 3 and door 4, and a hinged flap 6.

The magazine 10 is open at the bottom 11. It is provided with finger-grips 12 and a rotatable stationary nut 13, having a handle 14. This magazine is made a sliding fit in the exposure-frame. Means for guiding it in the said frame consist of slidable bars 20, which slide in the sides of the exposure-frame and clip the magazine at its sides. These slidable bars are so arranged that when the magazine is pushed in the outer ends formed into clips 21 are flush with the top of the magazine, and when the latter is partly withdrawn a shoulder 22 is engaged by a projection 15 on the magazine, which withdraws the bars 20 until another shoulder 23 thereon comes against a stop 7 in each side of the exposure-frame. By this means when the magazine is fully withdrawn it is supported by the bars 20.

The sensitized plates 30 are shown with concave upper margins 31, rounded top corners 32, a notch 33 at each side below the rounded corners, and with the holes 34 pierced in the bottom margins, the hole in each plate being pierced to one side of the center line, and alternate plates have the holes upon opposite sides of the center line, so that the extracting-claw only engages one plate at a time. In Fig. 10 this arrangement is shown upon an exaggerated scale. The plates are shown inclosed in a thin metal case consisting of a back 40, a front 41, and a cap 42. Internal projections 43 come opposite to and engage in the notches 33, and thereby hold the plates in the case. This form of grip permits the plates to spring in and out of engagement therewith. Ears 44, having holes, are formed upon the top of the part 40, and a bar 45, having a screw 46, adapted to engage the nut 13 of the magazine 10, is pivoted at its ends in the ears. The front 41 of the case is adapted to slide in the part 40, by which the bottom margins of the plates are exposed at one side, so that the claw can engage the holes therein. The case is drawn up into the magazine by means of the screw 46 and the nut 13 through the bottom of the exposure-frame 1 when the door 4 is open and the slide 3 is withdrawn. The cap 42 passes into the cavity 5, and as the case is drawn up into the magazine the cap remains in the cavity. The slide 3 is then pushed in and the door 4 closed. Studs 15ª, fixed to the top of the magazine inside and passing through holes in the top of the part 40, bear upon the part 41, and as the case is drawn into the magazine the part 41 is slid down for a short distance.

For detaining the plates in the exposure-frame preferably two spring claws or hooks 50 are used. The claws are so set that they come opposite to the holes in the plates when the magazine is pushed in. Each plate having only one hole therein, only one claw or hook can be engaged at a time—that is to say, the one which comes opposite to the hole in the last plate, the other claw being simply depressed by the same plate.

Referring now to the improvements, in order to grip and hold fast the detained plate opposite to the exposure-aperture and at the same time in the same plane in which it has to enter the magazine as the latter is pushed in, I use two spring-pressed plates 60 and 70, which when the magazine is pushed in lie one upon one side and the other upon the other side of the same, and when the magazine is withdrawn they are pressed by their springs toward one another, gripping the detained plate between them. The plate 60 is formed as a frame having an aperture the same size, say, as that of the exposure-aperture 2. Upon each side of the frame 60 is fixed at one end a long bow-spring 61, adapted to lie flat upon the frame when the magazine is pushed in. The top 62 of these springs is fixed behind the sides of the exposure-aperture 2. The upper side or member 63 of the frame is beveled, as shown in Figs. 5 and 6, and has fingers 64 projecting outwardly adapted to rest upon the lower edge of the magazine when it is withdrawn, so as to insure the outward displacement of the frame as the magazine is pushed in and to control its movement inward at this end. The plate 70, Figs. 7, 8, and 9, is flat upon the front surface, which faces the exposure-aperture of the exposure-frame when in position. The springs 71 for forcing the plate forward are shown cut out of the material of the plate, as are also the fingers 51, carrying the claws 50.

In operating the apparatus, the magazine being charged with sensitized plates, when the magazine is pushed in the last or backmost plate therein is engaged with the spring-claw coming opposite to the hole therein, the other spring-claw being depressed by bearing upon the blank surface of the same plate. Upon now withdrawing the magazine the engaged plate is detained by the claw in the exposure-frame, and as soon as the magazine is fully withdrawn the spring-plate 70 is forced forward by its springs and the frame 60 is forced toward it by its springs until it lies in the position shown in Fig. 4, the sensitized plate 30 being gripped between the two spring-plates and lying in that plane in which it will enter the magazine again at the top of the pack of plates therein. The photograph is taken while the magazine is withdrawn. Upon pushing in the magazine the exposed plate is included therein, but, as before stated, at the front or top of the pack of plates therein.

What I claim as my invention, and desire to secure by Letters Patent, is—

1. The combination with a magazine plate-changing apparatus consisting of an exposure-frame having an exposure-aperture at the front; a spring-claw at the bottom adapted to seize the sensitized plates in the magazine one at a time; and a slide forming the magazine adapted to slide in and out of the exposure-frame at the top and to hold sensitized plates therein by their edges; of a flat plate adapted to lie behind the magazine when it is pushed in and having springs adapted to press it forward toward the exposure-aperture as the magazine is withdrawn; and a frame having springs behind adapted to lie between the margins of the exposure-aperture and the magazine when the latter is pushed in and to be pressed by the springs toward the said flat plate as the magazine is withdrawn and grip the sensitized plate between it and the flat plate substantially as set forth.

2. The combination with a magazine plate-changing apparatus consisting of an exposure-frame having an exposure-aperture at the front and a slide forming the magazine adapted to slide in and out of the exposure-frame at the top and to hold the sensitized plates therein by their side edges; of a flat plate having a spring-claw at the bottom adapted to seize the sensitized plates in the magazine one at a time, adapted to lie between the magazine and the back of the exposure-frame when the magazine is pushed in and having springs adapted to press it forward toward the exposure-aperture as the magazine is withdrawn;

and a frame adapted to lie between the margins of the exposure-aperture and the magazine when the latter is pushed in and having springs behind adapted to press it toward the said flat plate as the magazine is withdrawn so as to press the sensitized plate against the said flat plate and hold it opposite the exposure-aperture substantially as set forth.

3. The combination with a magazine plate-changing apparatus consisting of an exposure-frame having an exposure-aperture at the front and having an opening at the top; a flat plate having springs bearing against the back, adapted to press it forward toward the front; means for seizing the sensitized plates in the magazine and detaining them one by one in the exposure-frame in front of the said flat plate; a slide forming the magazine adapted to slide in the opening at the top of the exposure-frame and to hold the sensitized plates therein by their edges; and means for pressing back the top edge of the said flat plate as the magazine is pushed in so that the magazine rides over it; of a frame having an aperture the size of the photograph to be taken, an inwardly-beveled top edge and a stop to prevent its inward movement past the magazine at the top, springs to press it toward the magazine, said frame being adapted to lie behind the margins of the exposure-aperture and between it and the magazine, when the latter is pushed in and to hold the sensitized plate left in the exposure-frame between it and the said flat plate in line so as to enter the magazine as the latter is pushed in, substantially as set forth.

4. A magazine plate-changing apparatus consisting of an exposure-frame having an exposure-aperture at the front, a light-proof door at the bottom, said frame having a cavity above the door, stops at the sides of said cavity, a slidable plate above the cavity, guideways in the sides thereof, and a hinged flap at the top directed toward the front and pressed outward by springs; a magazine open at the bottom and adapted to slide in the exposure-frame through the top end, means for drawing up a case containing the sensitized plates and having a cap at the bottom adapted to bear against said stops and be detained in the said cavity when the case is being drawn into the magazine and the slidable plate is withdrawn, guide-bars at the sides of the exposure-frame adapted to slide in said guideways and support the magazine at their outer ends when the same is withdrawn; a flat plate in the back of the exposure-frame adapted to lie between it and the magazine when the latter is pushed in and having springs adapted to press it forward toward the front as the magazine is withdrawn; means for seizing the bottom margins of the sensitized plates in the magazine one at a time and detaining them in the exposure-frame in front of said flat plate as the magazine is withdrawn; and a frame having an aperture the size of the photograph, an internally-beveled top edge, springs adapted to press it toward the said flat plate and a stop to limit its movement at the top, said frame being adapted to lie between the margins of the exposure-aperture and the magazine when the latter is pushed in and to hold the sensitized plate left in the exposure-frame against said flat plate in line so as to enter the magazine as the latter is pushed in, substantially as set forth.

5. A magazine plate-changing apparatus comprising an exposure-frame, a magazine sliding therein and adapted to hold a pile of plates or films, means for engaging the outside plate on one side of the pile and detaining it in the frame when the magazine is pulled out, a pair of members normally occupying positions on either side of the magazine and spring-pressed toward each other so as to grip the withdrawn plate between them and hold it flat while detained in the exposure-frame, and means carried by said members and coacting with the edges of the magazine for again separating the members from each other and causing them to reassume positions on either side of the magazine, one of said members being provided with means directing the edge of the plate or film into the magazine at the opposite side of the pile of plates from that which it originally occupied.

In testimony whereof I have signed my name to this specification in the presence of two subscribing witnesses.

ARTHUR AUGUSTUS BROOKS.

Witnesses:
GEORGE A. WATSON,
FREDERIC S. BISHOP.